United States Patent
Ikeda et al.

(10) Patent No.: US 8,991,908 B2
(45) Date of Patent: Mar. 31, 2015

(54) VEHICLE HOOD STRUCTURE

(75) Inventors: Koki Ikeda, Toyota (JP); Seiho Yonezawa, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 187 days.

(21) Appl. No.: 13/519,420

(22) PCT Filed: Dec. 28, 2009

(86) PCT No.: PCT/JP2009/071801
§ 371 (c)(1),
(2), (4) Date: Jun. 27, 2012

(87) PCT Pub. No.: WO2011/080835
PCT Pub. Date: Jul. 7, 2011

(65) Prior Publication Data
US 2012/0285759 A1    Nov. 15, 2012

(51) Int. Cl.
*B62D 25/10*    (2006.01)
*B60R 21/34*    (2011.01)

(52) U.S. Cl.
CPC ............... *B62D 25/105* (2013.01); *B60R 21/34* (2013.01); *B60R 2021/343* (2013.01)
USPC .................. 296/193.11; 296/187.04

(58) Field of Classification Search
CPC .................................................... B62D 25/105
USPC .......... 296/193.11, 187.03, 187.04; 180/69.2, 180/69.21
See application file for complete search history.

(56) References Cited

U.S. PATENT DOCUMENTS

| 7,055,894 | B2 * | 6/2006 | Ikeda et al. | 296/187.09 |
|---|---|---|---|---|
| 7,150,496 | B2 * | 12/2006 | Fujimoto | 296/187.04 |
| 7,635,157 | B2 * | 12/2009 | Wang et al. | 296/193.11 |
| 2008/0007094 | A1 | 1/2008 | Ishitobi | |

FOREIGN PATENT DOCUMENTS

| CN | 2761491 Y | 3/2006 |
|---|---|---|
| EP | 1 707 452 A2 | 10/2006 |
| EP | 1 876 085 A1 | 1/2008 |
| JP | 63 161084 | 10/1988 |

(Continued)

OTHER PUBLICATIONS

Extended European Search Report issued Sep. 18, 2013 in Patent Application No. 09 852 813.6.

(Continued)

*Primary Examiner* — Glenn Dayoan
*Assistant Examiner* — Melissa A Black
(74) *Attorney, Agent, or Firm* — Oblon, McClelland, Maier & Neustadt, L.L.P.

(57) ABSTRACT

A vehicle hood structure capable of both raising the energy absorbing ability when an impacting body has impacted a hood and enhancing deformation properties of the hood during a frontal collision. A framework formation section configuring a central region in a hood inner panel is provided with beads and indented portions formed to extend along the hood front-rear direction. Plural through holes are formed at a hood front-rear direction substantially central portion of the framework formation section in a row along the hood width direction. The through holes are formed in bottom portions of the indented portions. Beads are also formed in the two hood width direction edge portions in positions aligned with the hood front-rear direction positions of the through holes.

7 Claims, 17 Drawing Sheets

(56) References Cited

FOREIGN PATENT DOCUMENTS

| JP | 10 129529 | 5/1998 |
| JP | 2001 233248 | 8/2001 |
| JP | 2003 205866 | 7/2003 |
| JP | 2005 75163 | 3/2005 |
| JP | 2008-24192 A | 2/2008 |
| JP | 2008 30574 | 2/2008 |

OTHER PUBLICATIONS

International Search Report Issued Feb. 9, 2010 in PCT/JP09/71801 Filed Dec. 28, 2009.

* cited by examiner

VEHICLE HOOD STRUCTURE

TECHNICAL FIELD

The present invention relates to a vehicle hood structure to be applied to a vehicle such as an automobile.

BACKGROUND ART

Vehicle hood structures are known with a hood inner panel joined to a hood outer panel (for example, refer to Japanese Patent Application Laid-Open No. 2005-75163), with a specified hood rigidity secured from the perspective of pedestrian protection. In such structures, there are cases in which, for example, a bead is formed to the hood inner panel extending in the hood width direction at a substantially central portion in the front-rear direction of the hood, so as to make the hood deform with a folded state protruding towards the vehicle top side in vehicle side view during a front-side impact (below referred to as in a frontal collision).

DISCLOSURE OF INVENTION

Technical Subject

However, there is still room for improvement from the perspective of improving both the energy absorbing ability of a hood when impacted by an impacting body, and enhancing deformation properties of the hood in a frontal collision.

In consideration of the above circumstances, a subject of the present invention is to obtain a vehicle hood structure capable of both raising the energy absorbing ability when an impacting body has impacted the hood and enhancing deformation properties of the hood during a frontal collision.

Solution to Subject

A vehicle hood structure according to a first aspect of the present invention includes: a hood outer panel configuring an outer sheet of a hood; a hood inner panel disposed at a hood bottom side with respect to the hood outer panel, joined to the hood outer panel and configuring an inner sheet of the hood; and a framework formation section configuring a central region of the hood inner panel excluding outer peripheral edge sections of the hood inner panel and formed with plural indented portions having indented profiles towards an opposite side to a hood outer panel side, and with plural through holes, plural thinned portions, or any combination thereof, formed in a row along a hood width direction at a hood front-rear direction substantially central portion of the framework formation section.

According to a vehicle hood structure of the first aspect of the present invention, the hood inner panel configuring the inner sheet of the hood is disposed at the hood bottom side with respect to the hood outer panel configuring the outer sheet of the hood and the hood inner panel is joined to the hood outer panel. The hood framework formation section configuring the central region of the hood inner panel excluding the outer peripheral edge sections of the hood inner panel is formed with plural indented portions having indented profiles towards the opposite side to the hood outer panel side, and plural through holes, plural thinned portions (locations with a thinner sheet thickness than other locations), or any combination thereof are formed in a row along the hood width direction at the hood front-rear direction substantially central portion of the framework formation section. Unlike a comparative structure in which a bead is formed, the hood inner panel maintains a comparatively high rigidity and absorbs an energy that is required for plastic deformation of the hood inner panel even though such through holes, thinned portions, or any combination thereof are formed, since the hood inner panel cross-sectional height dimension has not been reduced. During a frontal collision, bending deformation occurs in a specific folding mode, with the through holes or the thinned portions formed in the hood inner panel acting as bending initiation points.

According to a vehicle hood structure of the first aspect of the present invention, the through holes, the thinned portions, or any combination thereof on the hood inner panel are formed in bottom portions of the indented portions. Hence when an impacting body has impacted the hood, buckling deformation of the hood inner panel with the through holes, thinned portions, or any combination thereof acting as initiation points is suppressed, as tension load acts on the bottom portions of the indented portions in the event that the hood attempts to deform towards the hood bottom side. However, during a frontal collision, buckling deformation of the hood inner panel occurs relatively easily with the through holes, the thinned portions, or any combination thereof acting as the initiation points, as compression load acts on the bottom portions of the indented portions in the event that the hood attempts to deform towards the hood top side.

A third aspect of the present invention is the vehicle hood structure of the first aspect in which: two hood width direction sides of the outer peripheral edge sections of the hood inner panel are set with a higher rigidity than the framework formation section; weakened portions are formed at locations in the two hood width direction sides of the outer peripheral edge section, the weakened portions are aligned in the hood front-rear direction with positions of the through holes, the thinned portions, or any combination thereof; and the weakened portions are set with a lower rigidity than other locations on the two hood width direction sides of the outer peripheral edge sections.

According to a vehicle hood structure of the third aspect of the present invention, the two hood width direction sides of the outer peripheral edge sections of the hood inner panel are set with a higher rigidity than the framework formation section, and the weakened portions formed at the two hood width direction sides of the outer peripheral edge sections are set with a lower rigidity than other locations on the two hood width direction sides of the outer peripheral edge sections. During a frontal collision, the hood inner panel accordingly starts fold-bending at the weakened portions of the outer peripheral edge portion due to such a configuration.

The weakened portions are formed at locations aligned with the positions in the hood front-rear direction of the through holes, the thinned portions, or any combination thereof in the framework formation section. Hence when fold-bending occurs at the weakened portions of the hood inner panel during a frontal collision, the fold-bending propagates out from the initiation points of the weakened portions along the through holes, the thinned portions, or any combination thereof, such that the entire hood inner panel fold-bends.

A fourth aspect of the present invention is the vehicle hood structure of the first or the third aspect, wherein the indented portions are formed so as to extend along the hood front-rear direction.

According to a vehicle hood structure of the fourth aspect of the present invention, the indented portions are formed so as to extend along the hood front-rear direction. A comparatively high rigidity is accordingly ensured even when the sheet thickness of the hood inner panel is set thin, so when an impacting body impacts the hood, an energy that is required for plastic deformation of the hood inner panel is absorbed. Deformation also occurs in a specific folding mode during a frontal collision, due to the through holes, thinned portions, or any combination thereof formed to the hood inner panel acting as bending initiation points. A fifth aspect of the present invention is the vehicle hood structure according to the third aspect, wherein the weakened portions are beads formed along a hood width direction in hood plan view, and the weakened portions are formed so as to act as initiation points where fold-bending occurs during load input to the hood inner panel from the hood front side before fold-bending occurs in the framework formation section. A vehicle hood structure according to a sixth aspect of the present invention includes: a hood outer panel configuring an outer sheet of a hood; and a hood inner panel disposed at a hood bottom side with respect to the hood outer panel, joined to the hood outer panel and configuring an inner sheet of the hood, wherein, due to forming plural indented portions having indented profiles towards the opposite side to a hood outer panel side, and due to forming plural through holes, plural thinned portions, or any combination thereof at bottom portions of the indented portions so as to form a row along a hood width direction at a hood front-rear direction substantially central portion of the hood inner panel, the hood inner panel is more easily deformable when load is input to the hood from the hood front direction than when load is input to the hood from the hood top direction.

A vehicle hood structure of a seventh aspect of the present invention includes: a hood outer panel configuring an outer sheet of a hood; and a hood inner panel disposed at a hood bottom side with respect to the hood outer panel, joined to the hood outer panel and configuring an inner sheet of the hood, wherein, due to forming in the hood inner panel plural indented portions having indented profiles towards the opposite side to a hood outer panel side, and due to forming plural through holes, plural thinned portions, or any combination thereof at bottom portions of the indented portions so as to form a row along a hood width direction at a hood front-rear direction substantially central portion of the hood inner panel, the hood inner panel is more easily deformable when compression load in the hood front-rear direction is input to the indented portions than when tension load in the hood front-rear direction is input to the indented portions from the hood top direction.

A vehicle hood structure of an eighth aspect of the present invention is applied to a hood that is capable of rotational movement about an axis running along a hood width direction at a hood front-rear direction rear edge portion of the hood and that is restricted from moving towards a hood rear side, the vehicle hood structure including: a pair of weakened portions formed at two hood width direction edge sections at a hood front-rear direction substantially central portion of the hood; and a structure provided at a straight line connecting together the pair of weakened portions and configured to more easily perform bending deformation towards a hood top side than to perform bending deformation towards a hood bottom side in response to load with a hood top-bottom direction component, wherein the structure that more easily performs bending deformation towards the hood top side than bending deformation towards the hood bottom side in response to load with a hood top-bottom direction component includes an indented portion having an indented profile towards the hood bottom side and a through hole, a thinned portion, or any combination thereof is formed at a bottom portion of the indented portion.

Advantageous Effects of Invention

As explained above, a vehicle hood structure according to the first aspect of the present invention has the excellent advantageous effect of being able to both improve the energy absorbing ability of the hood when impacted by an impacting body, and also to enhance deformation properties of the hood during a frontal collision.

A vehicle hood structure according to the third aspect of the present invention, has the excellent advantageous effect of being able to achieve yet further enhancement in the deformation properties of the hood during a frontal collision.

A vehicle hood structure according to the fourth aspect of the present invention, has the excellent advantageous effect of being able to achieve yet further improvements in the energy absorbing ability of the hood when impacted by an impacting body. According to the vehicle hood structures of the fifth aspect to the eighth aspect of the present invention, the excellent advantageous effect is exhibited of both enabling the energy absorbing ability when an impacting body has impacted the hood to be raised and enabling deformation properties of the hood during a frontal collision to be enhanced.

BEST MODE FOR CARRYING OUT THE INVENTION

First Exemplary Embodiment

Figure 1:
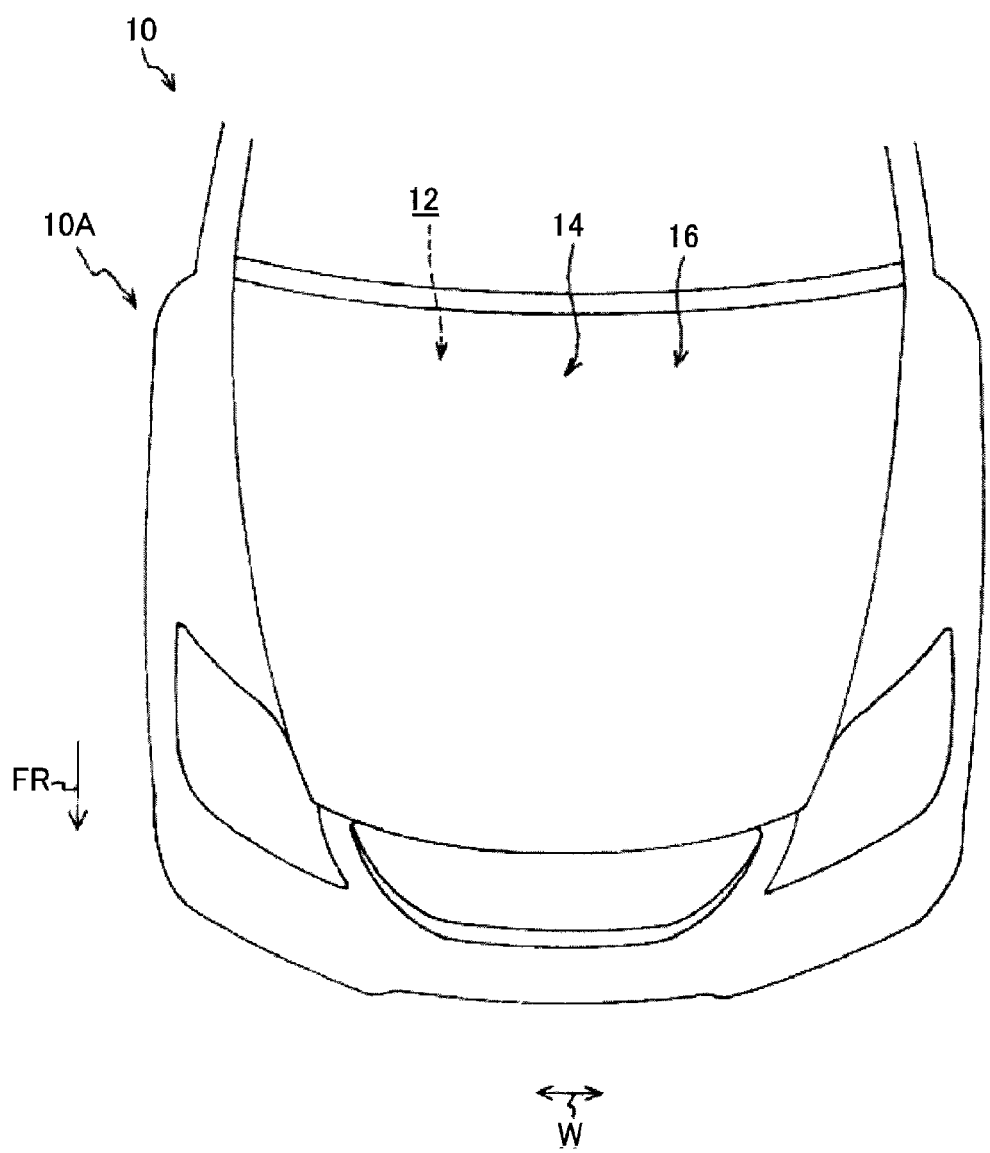
FIG. 1 is a plan view illustrating a front section of a vehicle to which a vehicle hood structure according to a first exemplary embodiment of the present invention has been applied.

Explanation follows regarding a vehicle hood structure according to a first exemplary embodiment of the present invention, with reference to FIG. 1 to FIG. 11. In the drawings, the arrow FR indicates the vehicle front-side, the arrow UP indicates the vehicle top side, and the arrows W indicate the two vehicle width directions, as appropriate. In a hood closed state, the hood front-rear direction is aligned in the same direction as the vehicle front-rear direction, the hood top-bottom direction is aligned in the same direction as the vehicle top-bottom direction, and the hood width direction is aligned in the same direction as the vehicle width direction.

FIG. 1 is a plan view illustrating a vehicle hood structure according to the present exemplary embodiment and applied to a vehicle front section. As shown in FIG. 1, a hood (engine hood) 14 is disposed at a vehicle front section 10A of an automobile (vehicle) 10. The hood 14 is capable of opening and closing to cover an engine compartment 12. An engine compartment installation such as a power unit (not shown in the drawings) is disposed inside the engine compartment 12 covered by the hood 14.

Figure 4A:
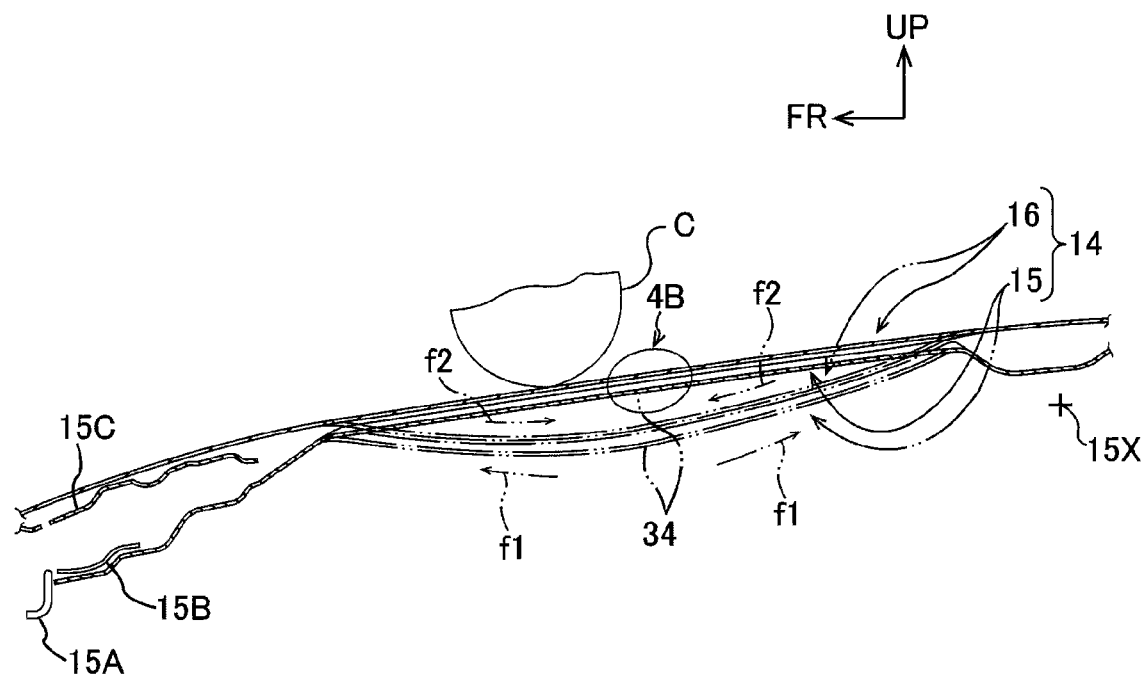
FIG. 4A is a side-view cross-section illustrating a hood to which the vehicle hood structure according to the first exemplary embodiment of the present invention has been applied in states of impact by an impacting body (a state after deformation is shown by an intermittent line)

The hood 14 is made from metal (an aluminum alloy in the present exemplary embodiment). Hinges (not shown in the drawings) are disposed at both sides of the hood front-rear direction rear edge portion of the hood 14. The hood 14 is accordingly capable of rotational movement at the hinges about an axis 15X (see FIG. 4A) along the hood width direction, in other words capable of opening and closing. The hood 14 has local reinforcement with reinforcement members (elements falling within the wide definition of "hood attachment members"). Namely, reinforcement is disposed on the hood 14, such as hinge reinforcement (not shown in the drawings) provided at the hinge side, and striker reinforcement 15B and dent reinforcement 15C provided on a hood striker 15A side, as shown in FIG. 4A.

Figure 2:
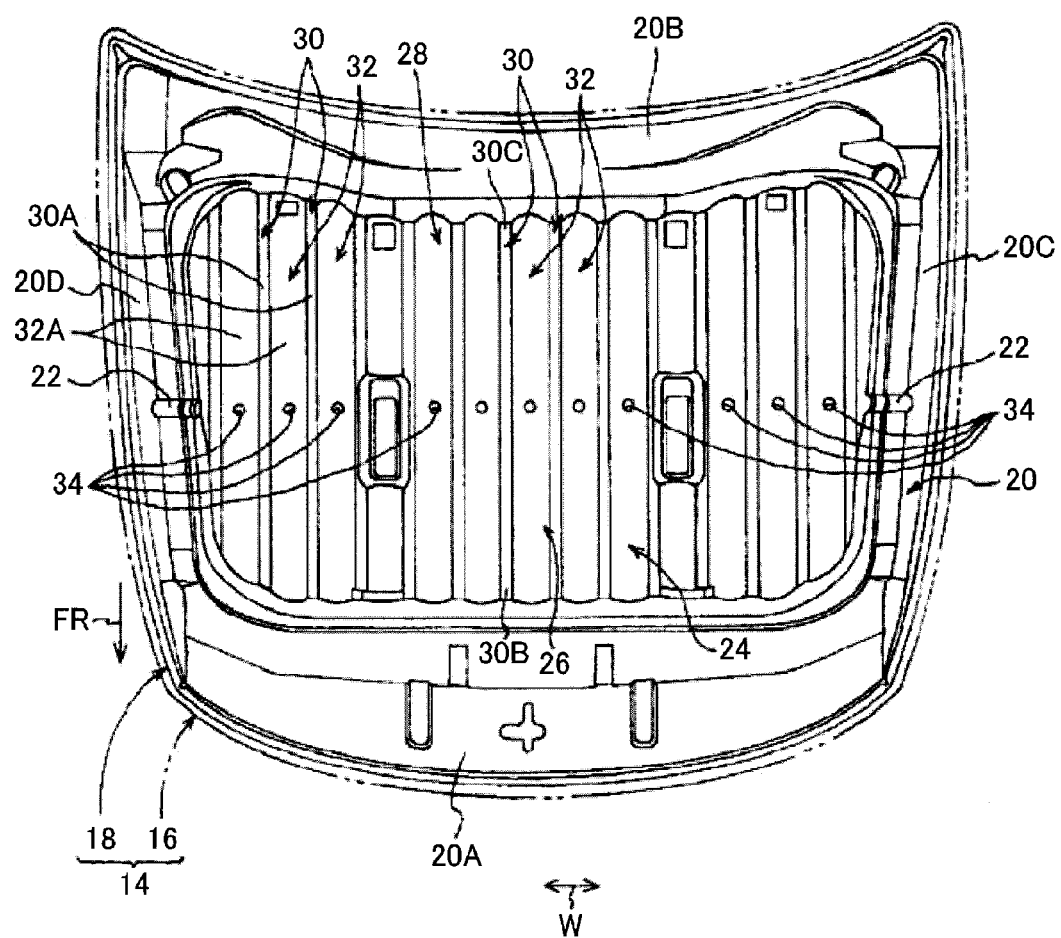
FIG. 2 is a plan view illustrating a hood to which the vehicle hood structure according to the first exemplary embodiment of the present invention has been applied (the hood outer panel is shown in a see-through state)

FIG. 2 is a plan view of the hood 14 in which a hood outer panel 16 (see the intermittent line) is illustrated in a see-through state. The hood 14 illustrated here is configured including the hood outer panel 16 configuring the outer sheet of the hood 14 and extending along substantially the vehicle front-rear direction, and a hood inner panel 18 that is disposed at the hood bottom side with respect to the hood outer panel 16 and is joined to the hood outer panel 16 so as to configure the inner sheet of the hood 14.

The hood outer panel 16 and the hood inner panel 18 are both formed by press forming a sheet of aluminum alloy. A thickness of the hood outer panel 16 and a thickness of the hood inner panel 18 are set according to several perspectives, including weight reduction and pedestrian protection ability. An outer peripheral portion of the hood outer panel 16 and an outer peripheral portion of the hood inner panel 18 are joined together by hemming A structure with a closed cross-section is formed by the hood outer panel 16 and the hood inner panel 18 when they are in an assembled state, with a gap formed between the two panels in the hood top-bottom direction.

An outer peripheral edge portion 20 of the hood inner panel 18 is configured with a front edge portion 20A at the hood front-rear direction front edge side, a rear edge portion 20B at the hood front-rear direction rear edge side, and two hood width direction edge portions 20C, 20D at the two sides in the hood width direction. A central region 24 is formed at inside of the outer peripheral edge portion 20 (namely portions of the hood inner panel 18 other than the outer peripheral edge portion 20).

The two hood width direction edge portions 20C, 20D are formed to have a large cross-sectional height dimension in order to raise rigidity to twisting of the hood 14, whereby the edge portions 20C, 20D configure high rigidity portions than a framework formation section 26 configuring the central region 24. Hood hinge reinforcement (not shown in the drawings) is disposed along the hood front-rear direction and fixed to the bottom face side of the edge portions 20C, 20D. The hood hinge reinforcement is configured by elongated high strength-high rigidity members for strengthening the attachment location of the hood 14 to the hinge.

A bead 22 is formed as a weakened portion at a hood front-rear direction substantially central portion of each of the two hood width direction edge portions 20C, 20D. When viewed in cross-section along the hood front-rear direction, the beads 22 are formed as raised ridges with a profile projecting out towards the hood outer panel 16 side (the hood top side), with the beads 22 formed so as to run along the hood width direction in hood plan view. The beads 22 are set with a lower rigidity to load in the hood front-rear direction than other locations on the edge portions 20C, 20D. The edge portions 20C, 20D are set with higher rigidity than the framework formation section 26, and so a configuration with the lower rigidity beads 22 provided to the edge portions 20C, 20D can be said to be generally beneficial (or a configuration which is not detrimental) from the perspective of controlling a preferable range for impacting body acceleration when an impacting body impacts the hood 14.

Figure 3A:
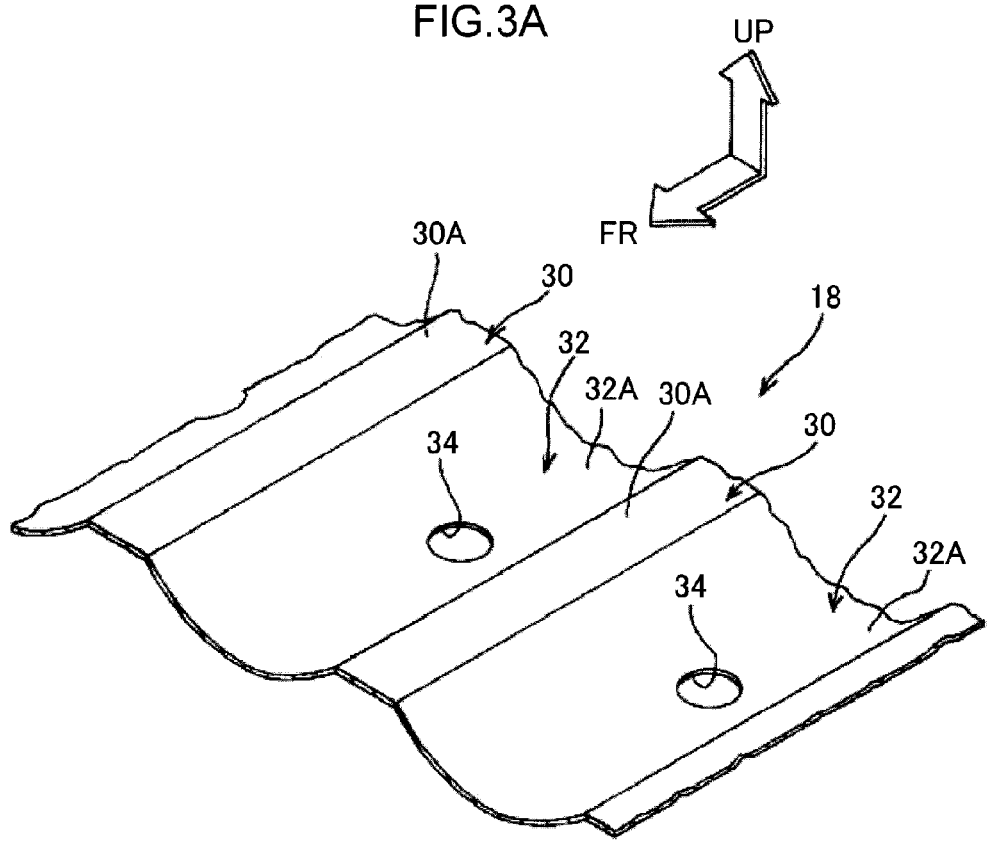
FIG. 3A is a perspective view illustrating a portion of a framework formation section of the first exemplary embodiment of the present invention.
Figure 3B:
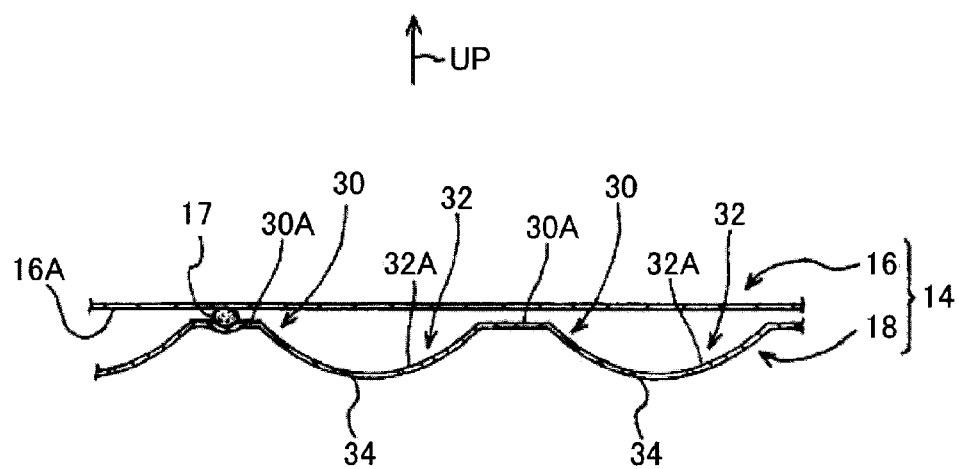
FIG. 3B is a cross-section along the hood width direction and illustrating a portion of the framework formation section of the first exemplary embodiment of the present invention.

Plural beads 30 are formed in the central region 24 of the hood inner panel 18 so as to extend along the hood front-rear direction in hood plan view. Each of the beads 30 is formed at the central region 24 of the panel (hood inner panel 18) as a raised ridge with a profile projecting out towards a hood outer panel 16 side when viewed in cross-section along an orthogonal plane to the length direction of the beads 30. The beads 30 are configured with flat profile top portions 30A, as shown in FIG. 3A and FIG. 3B. Some of the top portions 30A of the beads 30 are joined to a back face 16A of the hood outer panel 16 by bonding with a mastic 17 bonding agent, as shown in FIG. 3B.

As shown in FIG. 2, a front edge portion 30B of each of the beads 30 extends to the vicinity of the front edge portion 20A of the hood inner panel 18, and a rear edge portion 30C of each of the beads 30 extends to the vicinity of the rear edge portion 20B of the hood inner panel 18. The beads 30 configure a framework for raising the bending rigidity in the hood front-rear direction of the central region 24 of the hood inner panel 18.

In the central region 24 of the hood inner panel 18 where the plural beads 30 are formed side-by-side, indented portions 32 are formed between top portions 30A of adjacent beads 30. The indented portions 32 have a concave profile that is indented towards a direction opposite to the hood outer panel 16 side. The plural indented portions 32 are formed so as to extend along the hood front-rear direction, and as shown in FIG. 3A and FIG. 3B, bottom portions 32A of the indented portions 32 are formed with a curved profile when viewed in cross-section. Namely, as shown in FIG. 2, the beads 30 and the indented portions 32 are alternately provided along the hood width direction in the central region 24, so as to form a corrugated section 28 with a corrugated profile when viewed in cross-section (a profile approximating to a continuous series of hat shapes), formed over nearly the entire area of the central region 24. The corrugated section 28 is formed at a position that faces the engine compartment installation (not shown in the drawings) inside the engine compartment 12.

Plural through holes 34 are formed in a row along the hood width direction, so as to pierce through hood front-rear direction substantially central portions of the framework formation section 26. The through holes 34 and the beads 22 of the two hood width direction edge portions 20C, 20D are set in positions that align with each other in the hood front-rear direction position, and configure locations at hood front-rear direction substantially central portions of the hood inner panel 18 where bending deformation is induced during a frontal collision. As shown in FIG. 3A and FIG. 3B, in the present exemplary embodiment the through holes 34 are circular holes (see FIG. 3A) formed with one in each of the bottom portions 32A of the indented portions 32 (the bottom portion of the hood inner panel 18). Due to forming the through holes 34 in the hood inner panel 18, since electro-deposited paint film (ED paint film) is formed sequentially from a position near to the through holes 34, the covering ability of the electro-deposited paint (ED paint) can be improved.

Operation/Advantageous Effects

Figure 5A:
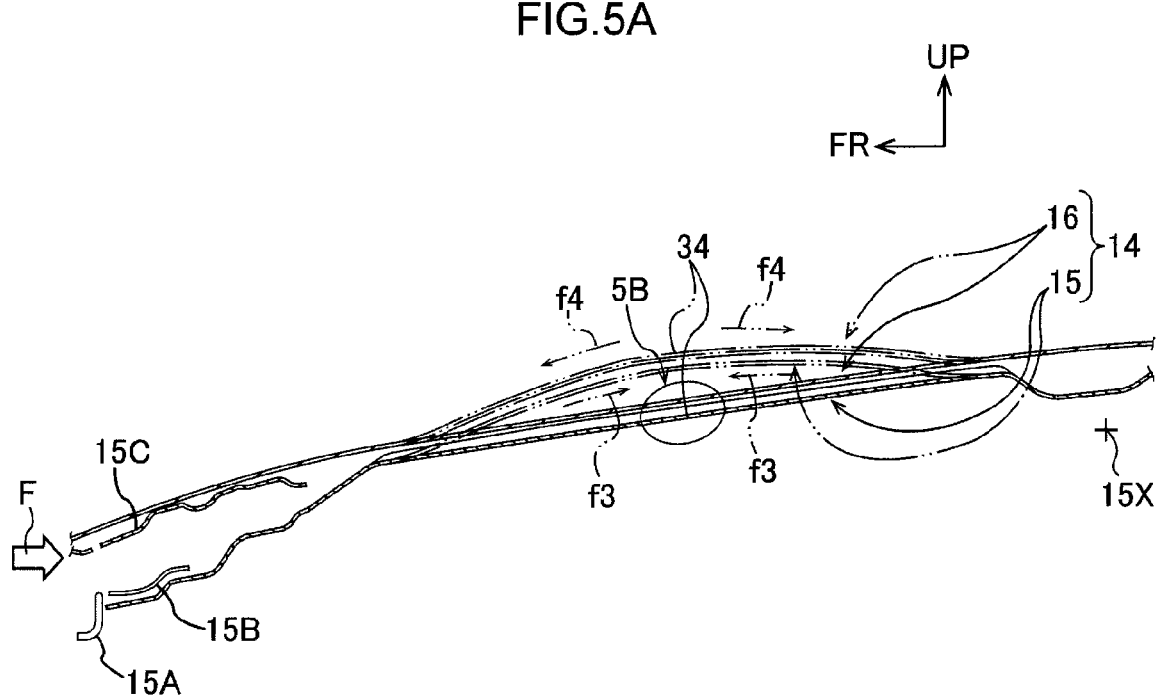
FIG. 5A is a side cross-section illustrating a hood to which the vehicle hood structure according to the first exemplary embodiment of the present invention has been applied in vehicle frontal collision states (a state after deformation is shown by an intermittent line)

Explanation follows regarding operation and advantageous effects of the above exemplary embodiment. FIG. 4A illustrates a state of the hood 14 when an impacting body C (a head impact) impacts, and FIG. 5A illustrates a state of the hood 14 during a frontal collision. States after deformation are illustrated in the drawings by the intermittent lines (the double-dot intermittent lines).

As shown in FIG. 2, in the hood inner panel 18, the framework formation section 26 configuring the central region 24 is formed with the corrugated section 28, and the plural through holes 34 are also formed in a row along the hood width direction at a front-rear direction substantially central portion of the framework formation section 26. The hood inner panel 18 maintains a comparatively high rigidity even though formed with the through holes 34, in contrast to a comparative structure formed with beads, due to the cross-sectional height of the hood inner panel 18 not being reduced, as shown in FIG. 3B. The hood inner panel 18 accordingly absorbs the energy required for plastic deformation of the hood inner panel 18 when the impacting body C impacts, as shown in FIG. 4A. During a frontal collision, bending deformation occurs in a specific folding mode, with the through holes 34 formed in the hood inner panel 18 acting as bending initiation points, as shown in FIG. 5A. In FIG. 5A, the input direction of a frontal collision load is illustrated by arrow F.

As shown in FIG. 2, the indented portions 32 are formed so as to extend along the hood front-rear direction, and as shown in FIG. 3A and FIG. 3B, the through holes 34 of the hood inner panel 18 are formed in the bottom portions 32A of the indented portions 32.

Figure 4B:
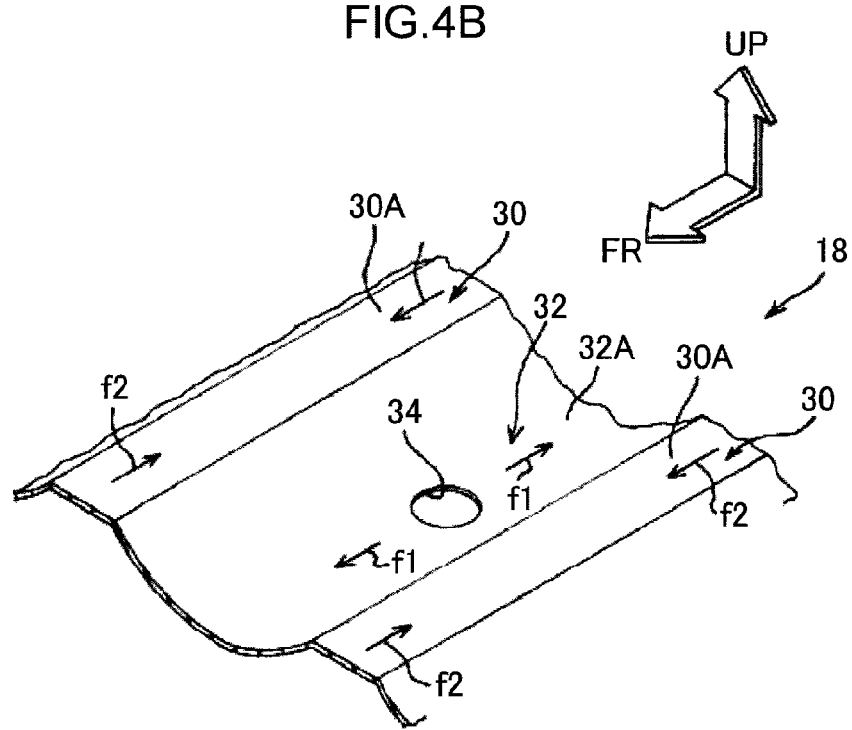
FIG. 4B is a schematic perspective view illustrating the portion of the hood inner panel in an enclosed region indicated by arrow 4B in FIG. 4A.

Therefore, as shown in FIG. 4A, when the impacting body C has impacted the hood 14 and the hood 14 attempts to be deformed towards the hood bottom side, a tension load f1 acts on the bottom portions 32A of the indented portions 32, as shown in FIG. 4B, and a compression load f2 acts on the top portions 30A of the beads 30. The edge portions of the through holes 34 in the bottom portions 32A have a comparatively high rigidity to the tension load f1, and so buckling deformation (folding deformation) of the hood inner panel 18 with the through holes 34 as the initiation points is suppressed. A high energy absorbing efficiency (pedestrian protection countermeasure) is accordingly maintained when the impacting body C impacts the hood 14 as illustrated in FIG. 4A.

Figure 8:
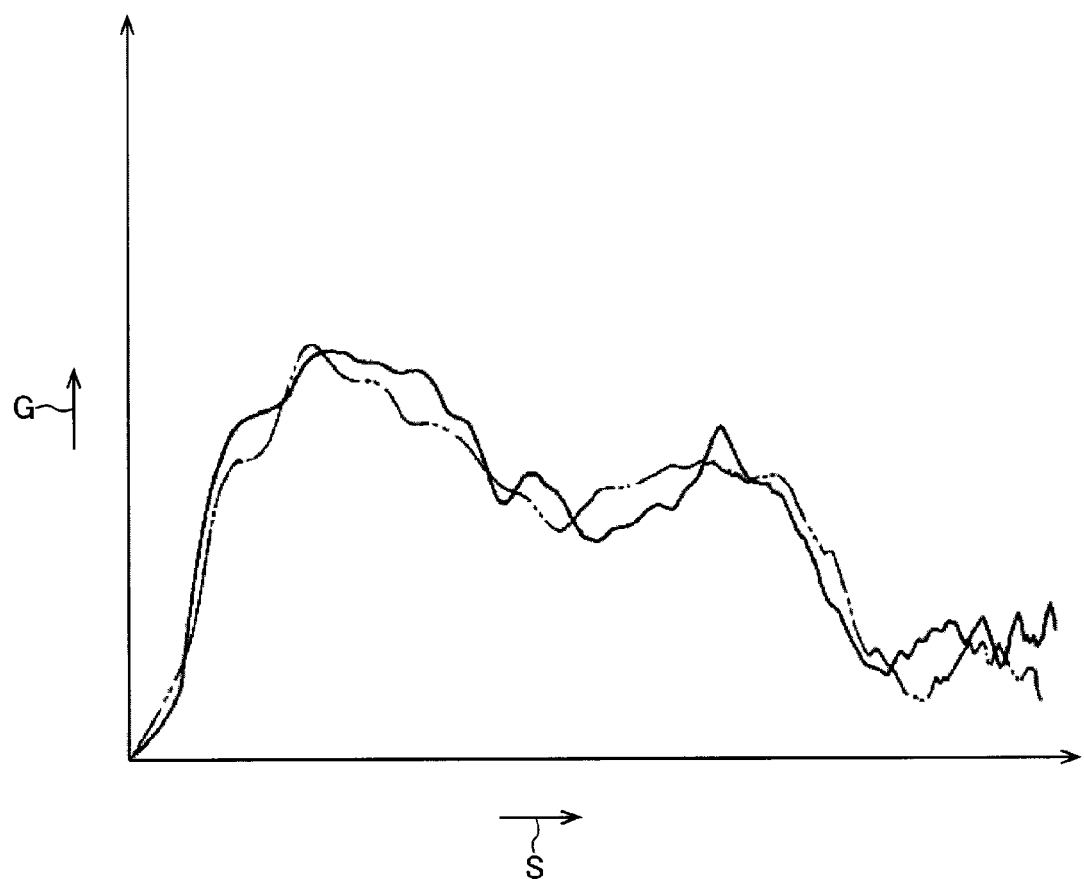
FIG. 8 is a G-S graph illustrating relationships between impacting body acceleration and impacting body displacement amount when an impacting body has impacted the hood.
Figure 9:
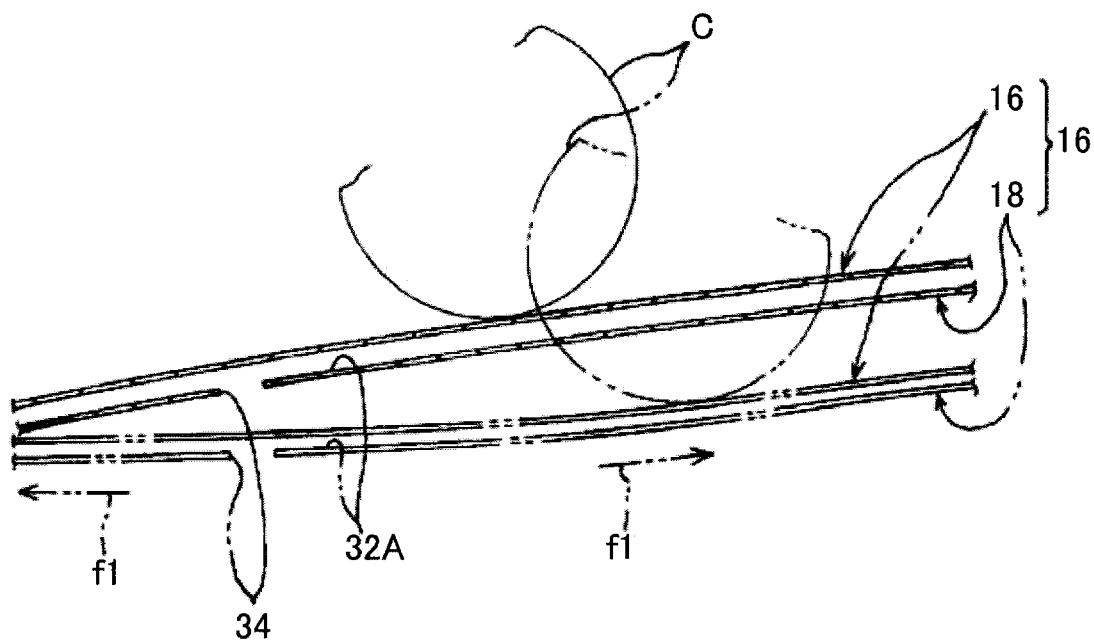
FIG. 9 is a side cross-section illustrating states of a hood when impacted by an impacting body.

Supplementary explanation follows regarding operation when the impacting body C impacts, with reference to FIG. 8 and FIG. 9. FIG. 8 is a G-S graph (Computer Aided Engineering (CAE) result) illustrating relationships between impacting body acceleration and impacting body displacement amount (penetration amount) when an impacting body impacts a hood. The horizontal axis (S) illustrates a displacement amount of the impacting body that has impacted the hood, and the vertical axis (G) indicates the acceleration imparted to the impacting body. The solid line illustrates the G-S graph for a vehicle hood structure according to the present exemplary embodiment, and the double-dot intermittent line indicates the G-S graph for a structure similar to that of the present exemplary embodiment except in that the through holes 34 are not formed therein.

As shown in FIG. 8, even though the through holes 34 are formed in the vehicle hood structure according to the present exemplary embodiment, there is no large reduction in an amount of the acceleration acting on the impacting body C (in other words substantially the same energy absorption amount can be secured) and there is also substantially no change to the displacement amount of the impacting body, in comparison to the comparative structure not formed with the through holes 34. It is accordingly possible to avoid the impacting body C impacting the engine compartment installation through the hood 14 even when the gap between the hood 14 and the engine compartment installation inside the engine compartment 12 is set similarly to when the through holes 34 are not formed.

As shown in FIG. 9, even if the hood inner panel 18 is deformed towards a hood bottom side due to the impacting body C impacting the hood 14, the edge portions of the through holes 34 in the bottom portions 32A have comparatively high rigidity to the tension load f1 and so folding deformation from the through holes 34 is suppressed. In FIG. 9 the solid lines illustrate position of the hood 14 and the impacting body C immediately after impact of the impacting body C, and the double-dot intermittent lines illustrate the positions of the hood 14 and the impacting body C in a state in which the impacting body C has been displaced by a specific amount after the impacting body C has impacted.

Figure 5B:
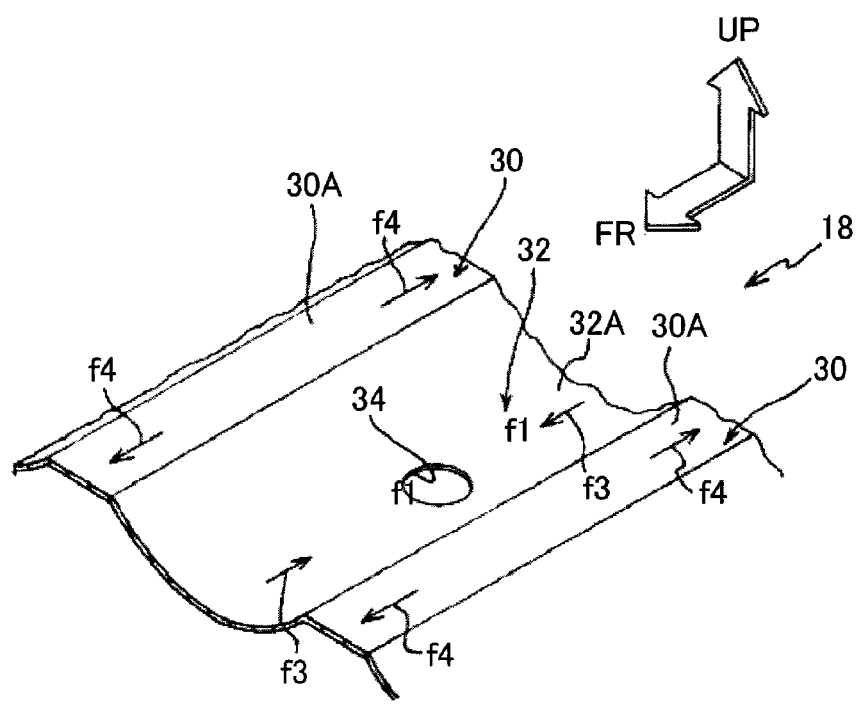
FIG. 5B is a schematic perspective view illustrating the portion of the hood inner panel in an enclosed region indicated by arrow 5B in FIG. 5A.
Figure 6:
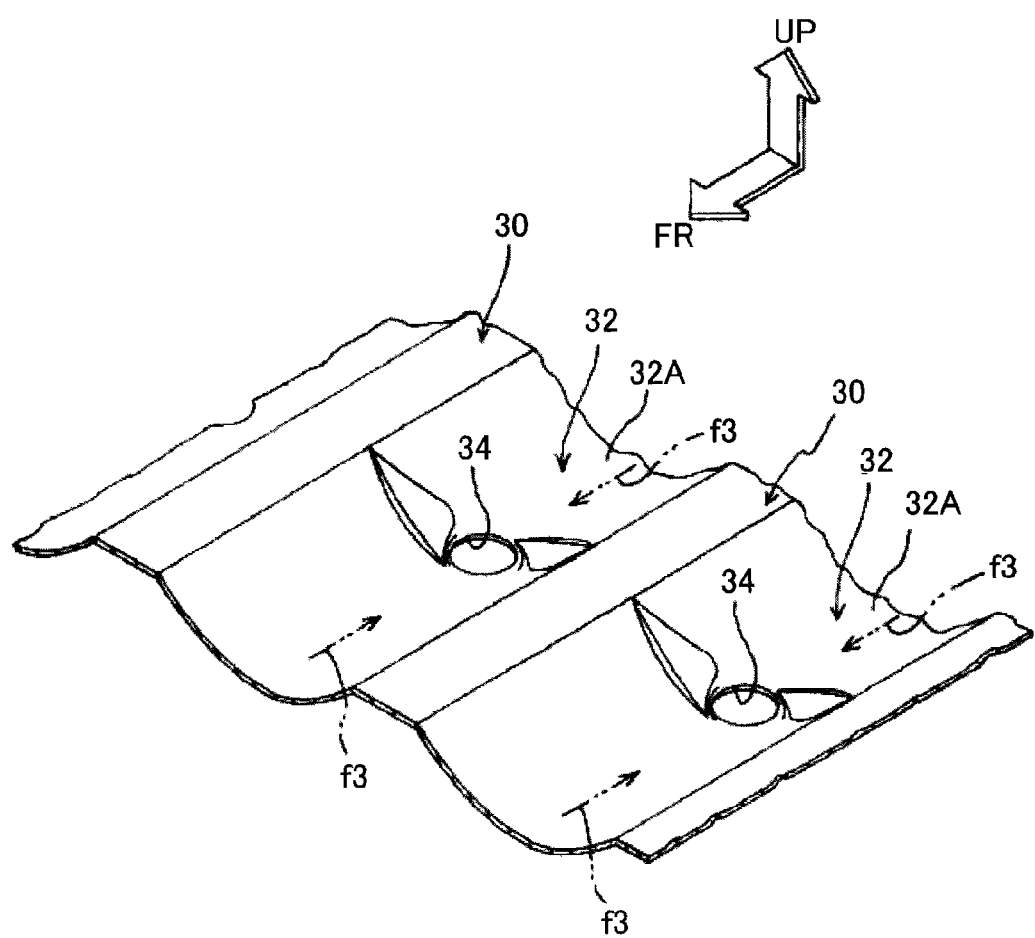
FIG. 6 is a perspective view schematically illustrating a state in which stress has been concentrated at edges of the through holes and profiles around the through holes have collapsed.

In contrast, when the hood 14 attempts to be deformed towards a hood top side during a frontal collision, as shown in FIG. 5A illustrating the state of the hood 14 during a frontal collision, a compression load f3 acts on the bottom portions 32A of the indented portions 32 and a tension load f4 acts on the top portions 30A of the beads 30, as shown in FIG. 5B. Namely, the direction in which the hood 14 attempts to be deformed during a frontal collision is different from the direction when the hood 14 is impacted by the impacting body C (see FIG. 4A), and the load directions acting on the bottom portions 32A of the indented portions 32 are also different. During a frontal collision, stress due to the compression load f3 acting on the bottom portions 32A of the indented portions 32 is concentrated on the edge portions of the through holes 34 as illustrated in FIG. 6, and cross-sectional deformation occurs at the periphery of the through holes 34. Namely, the bottom portions 32A perform buckling deformation relatively easily, with the weakened through holes 34 acting as the initiation points.

Figure 7A:
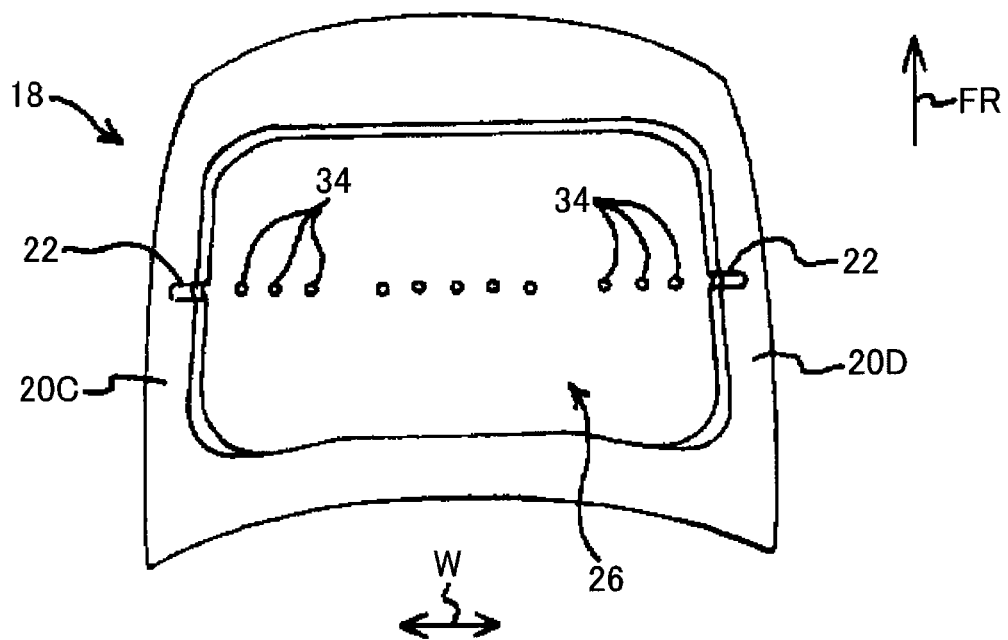
FIG. 7A is a schematic plan view illustrating the initial state of a hood inner panel prior to a frontal collision.
Figure 7B:
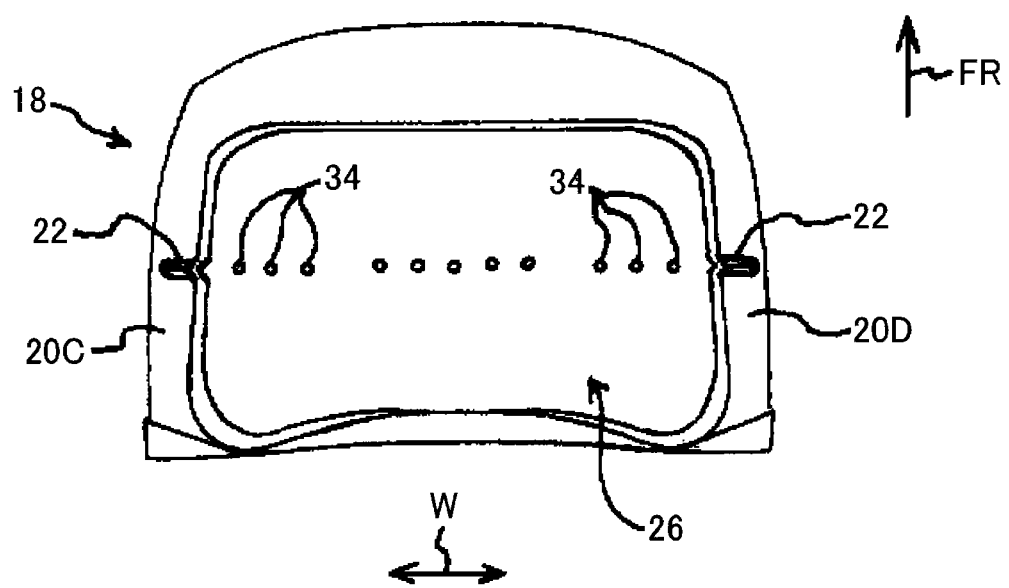
FIG. 7B is a schematic plan view illustrating a state of a hood inner panel with stress concentrated at beads at peripheral edge portions during a frontal collision.
Figure 7C:
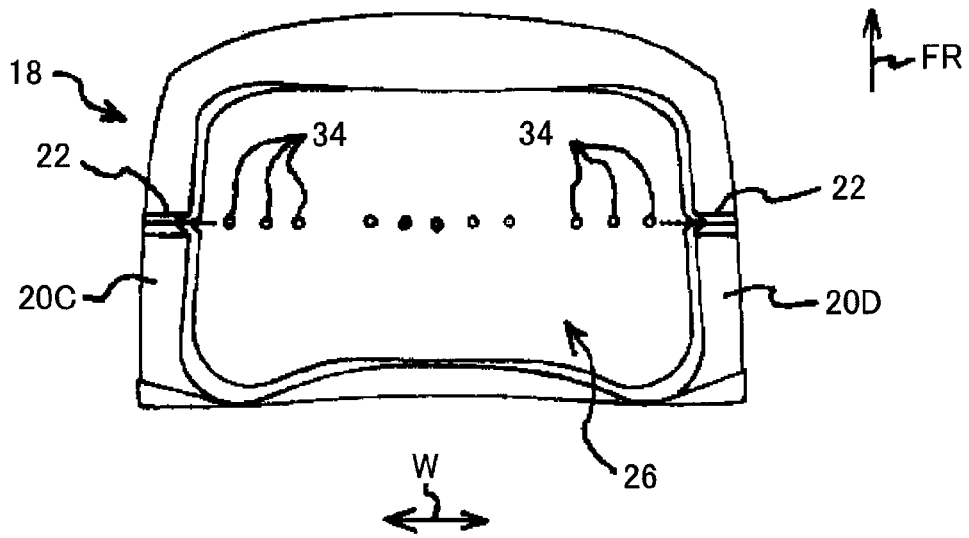
FIG. 7C is a schematic plan view illustrating a state of a hood inner panel when fold bending has occurred from the beads at the peripheral edge portions during a frontal collision.

In the vehicle hood structure according to the present exemplary embodiment, the two hood width direction edge portions 20C, 20D of the outer peripheral edge portion 20 of the hood inner panel 18 illustrated in FIG. 2 are set with higher rigidity than the framework formation section 26 of the central region 24, and the beads 22 formed in the edge portions 20C, 20D are set with lower rigidity than other locations of the edge portions 20C, 20D. Consequently, as schematically shown in plan view in FIG. 7A to FIG. 7E, during a frontal collision the deformation state of the hood inner panel 18 first transitions from an initial state illustrated in FIG. 7A, through a state in which stress is concentrated at the beads 22 of the outer peripheral edge portion 20 as illustrated in FIG. 7B, to a state in which fold-bending occurs in the outer peripheral edge portion 20 from the beads 22, as shown in FIG. 7C. Namely, stable fold-bending starts at the weakening beads 22 that have been formed in the higher rigidity sections of the edge portions 20C, 20D.

Figure 7D:
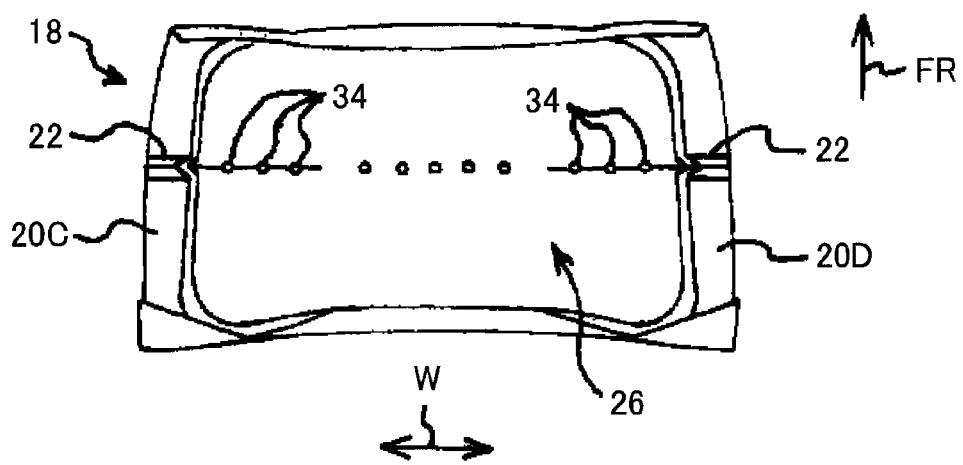
FIG. 7D is a schematic plan view illustrating a state of a hood inner panel in which fold bending is propagating along through holes from the beads as an initiation point during a frontal collision.
Figure 7E:
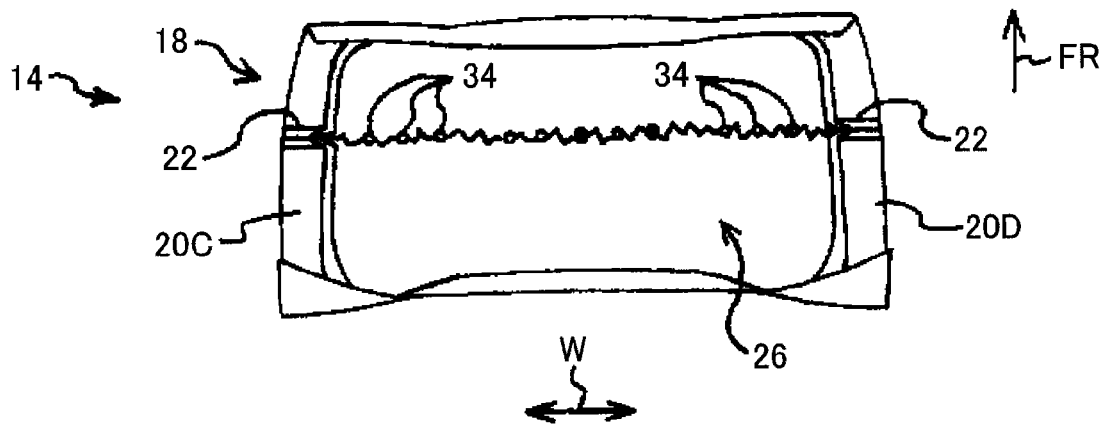
FIG. 7E is a schematic plan view illustrating a hood inner panel in a fold-bended state along the through holes during a frontal collision.

The beads 22 are formed here at locations aligned with the hood front-rear direction position of the through holes 34 in the framework formation section 26, and so when bending occurs at the beads 22 of the hood inner panel 18 during a frontal collision, fold-bending propagates from an initiation point of the beads 22 out along the through holes 34, as shown in FIG. 7D. Namely, stress in the framework formation section 26 is concentrated at the end portion of the through holes 34 as the through holes 34 is the weakest locations within the framework formation section 26, thereby promoting cross-sectional deformation in the vicinity of the through holes 34. Fold-bending propagates towards the hood width direction inside due to the through holes 34 being arranged in a row along the hood width direction. Namely, the fold-bend position of the hood 14 is determined by the position of the through holes 34, eventually resulting in the whole of the hood inner panel 18 (the hood 14) fold-bending along the through holes 34, as shown in FIG. 7E (in a stable fold-bend mode). The displacement amount during a frontal collision towards the vehicle rear-side of the rear edge of the hood 14 can accordingly be suppressed.

Figure 10:
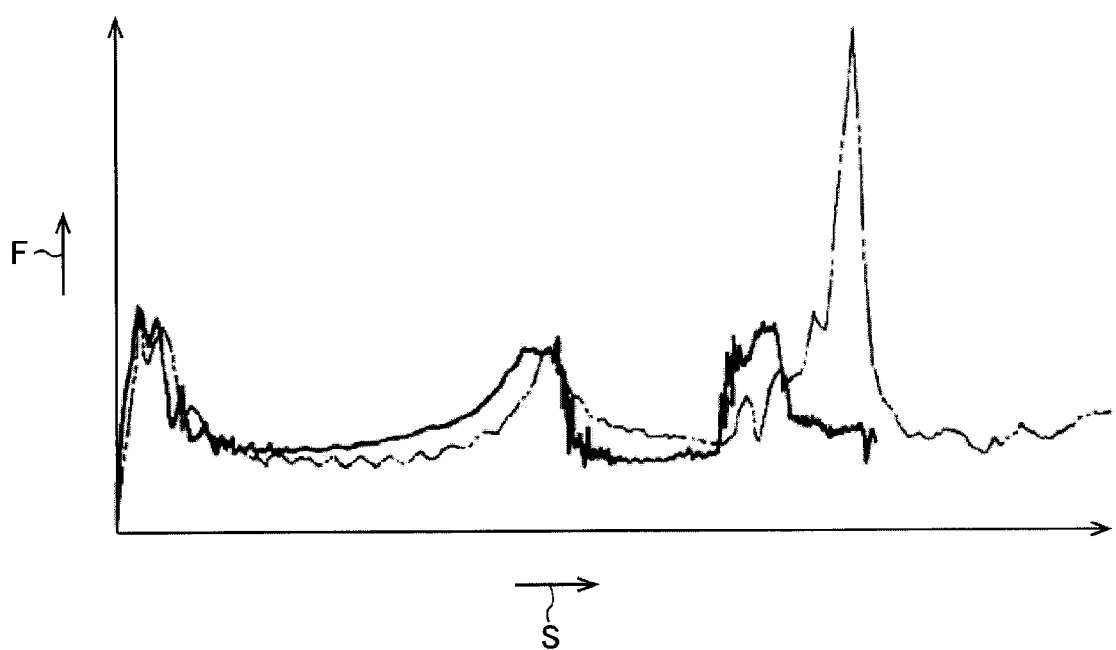
FIG. 10 is an F-S graph illustrating relationships between deformation load and displacement amount of a hood during a frontal collision.
Figure 11A:
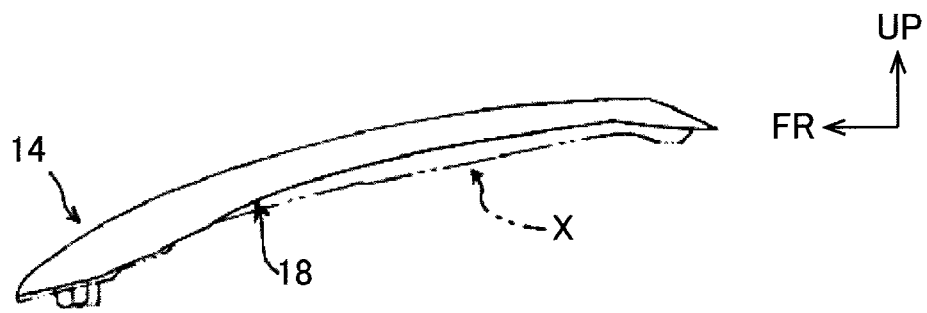
FIG. 11A is a side cross-section schematically illustrating the initial states of hood inner panels prior to a frontal collision.
Figure 11B:
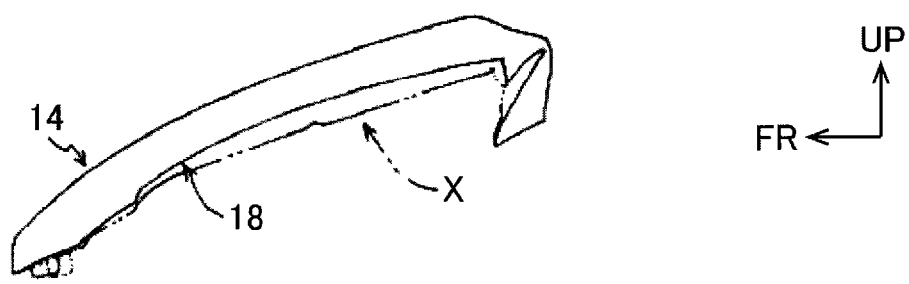
FIG. 11B is a side cross-section schematically illustrating states of hood inner panels that have deformed from the states shown in FIG. 11A during a frontal collision.
Figure 11C:
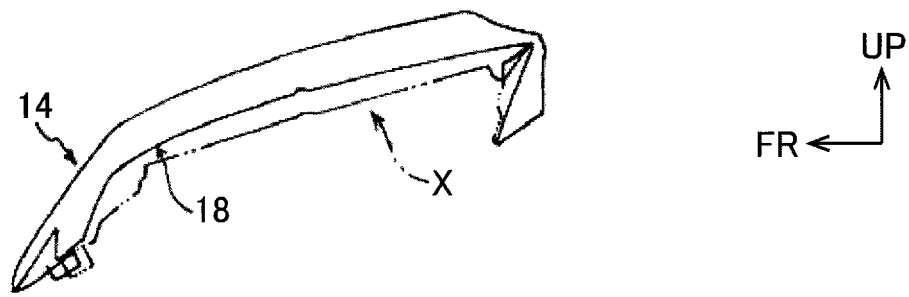
FIG. 11C is a side cross-section schematically illustrating states of hood inner panels that have further deformed from the states shown in FIG. 11B in during frontal collision.
Figure 11D:
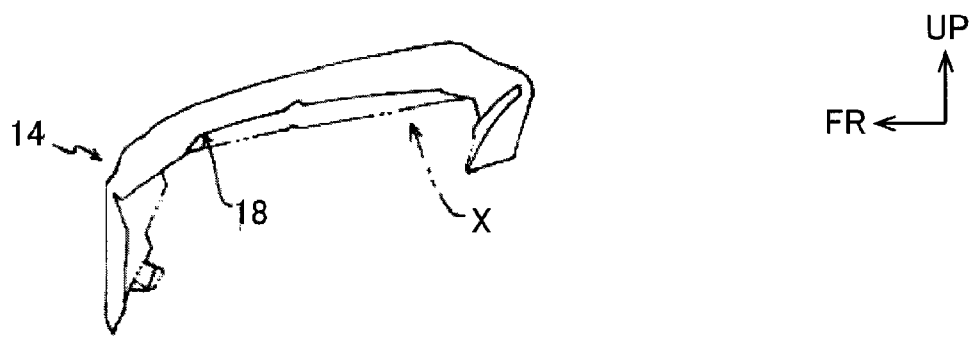
FIG. 11D is a side cross-section schematically illustrating states of hood inner panels that have further deformed from the states shown in FIG. 11C during a frontal collision.
Figure 11E:
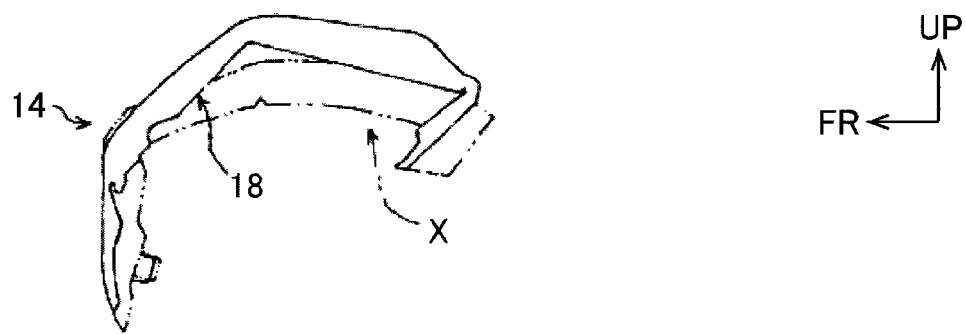
FIG. 11E is a side cross-section schematically illustrating states of hood inner panels that have further deformed from the states shown in FIG. 11D during a frontal collision.

Supplementary explanation follows regarding operation during a frontal collision, with reference to FIG. 10 and FIG. 11A to FIG. 11E. FIG. 10 is an F-S graph (Computer Aided Engineering (CAE) result) illustrating relationships between deformation load and displacement amount of a hood during a frontal collision. The horizontal axis (S) illustrates the deformation amount of the hood, and the vertical axis (F) indicates the deformation load on the hood. The solid line illustrates the F-S graph for a vehicle hood structure according to the present exemplary embodiment, and the double-dot intermittent line indicates the F-S graph for a comparative structure that, instead of the through holes 34 of the present exemplary embodiment, has a bead formed along the hood width direction at a front-rear direction substantially central portion with a profile protruding towards the hood outer panel side. It can be seen from FIG. 10 that in the vehicle hood structure according to the present exemplary embodiment, the deformation load (folding load) is reduced compared to the structure in which the bead is formed in place of the through holes 34.

States of deformation as viewed from the side of the hood inner panel 18 adopted during a frontal collision are schematically illustrated in FIG. 11A to FIG. 11E, in the sequence FIG. 11A, FIG. 11B, FIG. 11C, FIG. 11D to FIG. 11E. The solid lines illustrate the states of deformation of the hood 14 applied with the vehicle hood structure according to the present exemplary embodiment, and the double-dot intermittent lines X indicate the states of deformation of a hood of the comparative structure in which a bead is formed in place of the through holes 34 of the present exemplary embodiment. As shown in FIG. 11A to FIG. 11E, in the hood applied with the vehicle hood structure according to the present exemplary embodiment, a similar or higher deformation performance (folding properties) is secured than that of the comparative structure hood.

As explained above, the vehicle hood structure of the present exemplary embodiment enables both the energy absorbing ability to be raised when the hood 14 is impacted by the impacting body C as shown in FIG. 4A, and also the deformation performance of the hood 14 to be enhanced during a frontal collision as shown in FIG. 5A.

Figure 12A:
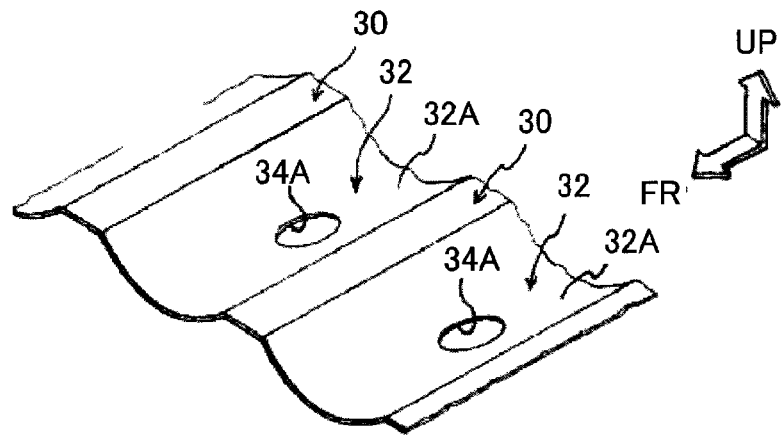
FIG. 12A is a perspective view illustrating a modified example in which through holes at bottom portions of indented portions are formed as elliptical holes.
Figure 12B:
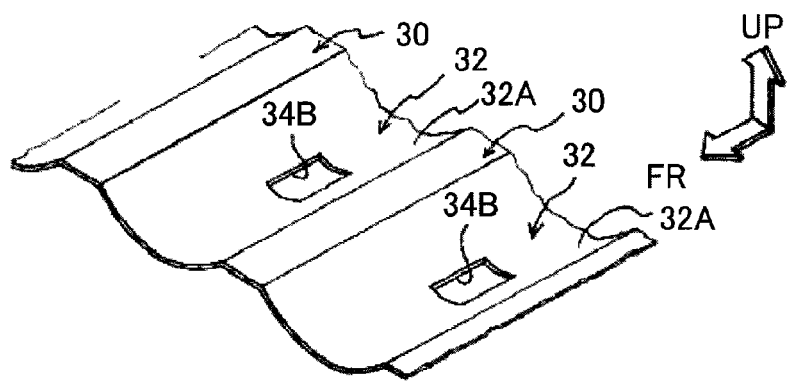
FIG. 12B is a perspective view illustrating a modified example in which through holes at bottom portions of indented portions are formed as rectangular holes.
Figure 12C:
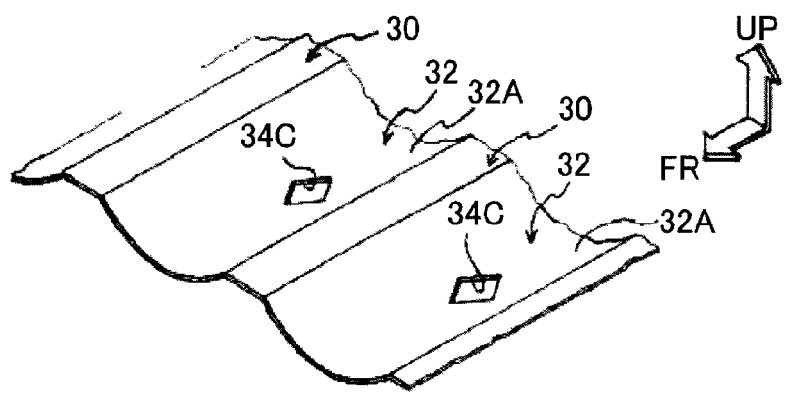
FIG. 12C is a perspective view illustrating a modified example in which through holes at bottom portions of indented portions are formed as diamond shaped holes.
Figure 12D:
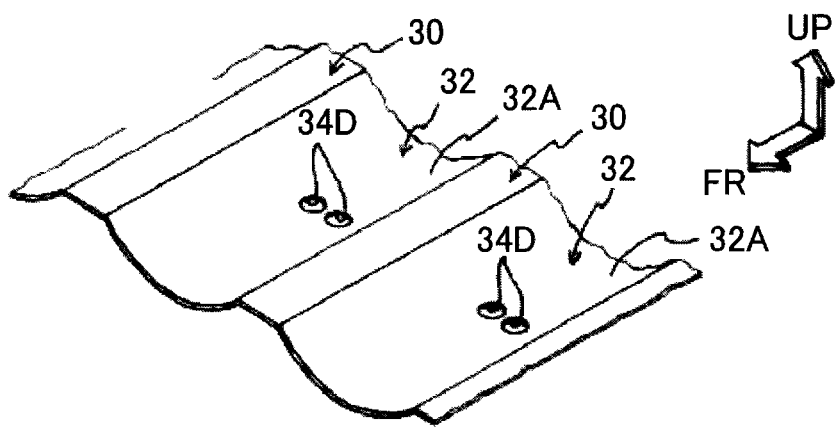
FIG. 12D is a perspective view illustrating a modified example in which plural through holes are formed at bottom portions of each of indented portions.

In the above exemplary embodiment, the through holes 34 are formed as circular holes in the bottom portions 32A of the indented portions 32, as shown in FIG. 3A. However configuration may be made as through holes of other shapes, such as elliptical holes 34A as shown in FIG. 12A, as rectangular shaped through holes 34B as shown in FIG. 12B, or as diamond shaped through holes 34C as shown in FIG. 12C. In the above exemplary embodiment, a single through hole 34 is formed in each of the bottom portions 32A, as shown in FIG. 3A, however configuration may be made with plural through holes 34D formed in a row along the hood width direction in each of the bottom portions 32A, as shown in FIG. 12D.

Second Exemplary Embodiment

Figure 13A:
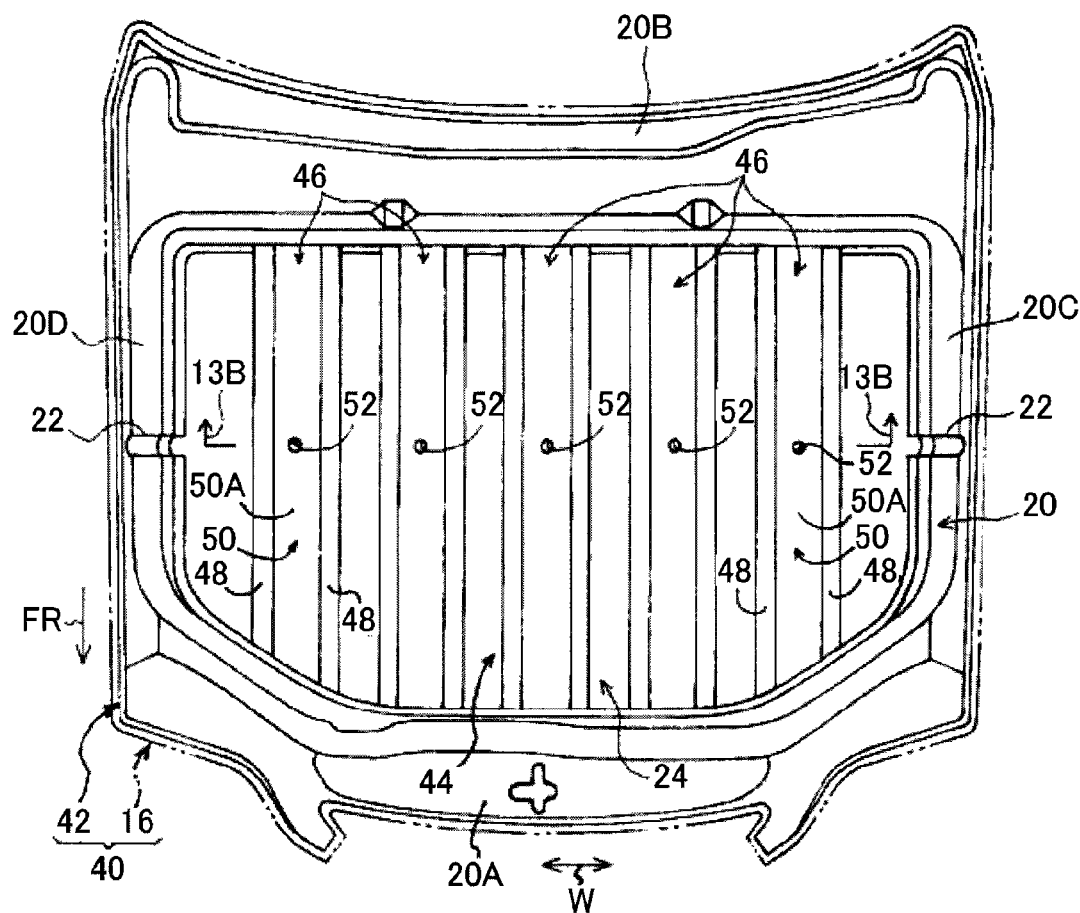
FIG. 13A is a plan view illustrating a hood to which the vehicle hood structure according to a second exemplary embodiment of the present invention has been applied (the hood outer panel is shown in a see-through state)
Figure 13B:
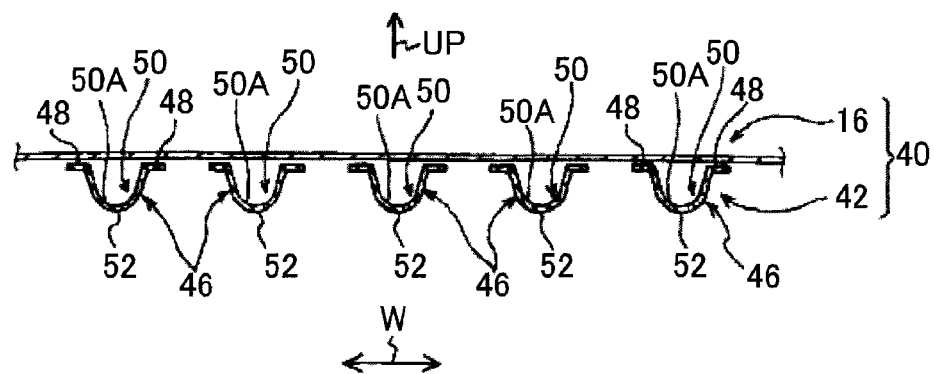
FIG. 13B is a cross-section along the line 13B-13B on FIG. 13A.

Explanation follows regarding a vehicle hood structure according to a second exemplary embodiment of the present invention, with reference to FIG. 13A and FIG. 13B. FIG. 13A is a plan view of a hood 40 in which a hood outer panel 16 (see the intermittent line) is illustrated in a see-through state (a drawing corresponding to FIG. 2 of the first exemplary embodiment). FIG. 13B shows a cross-section along the line 13B-13B in FIG. 13A.

As shown in these drawings, the hood 40 differs from the hood 14 of the first exemplary embodiment (refer to FIG. 2) in the point that it has a structure with plural beams 46 provided to a hood inner panel 42. Other parts of the configuration are substantially the same as the configuration in the first exemplary embodiment. Parts of the configuration essentially the same as those of the first exemplary embodiment are therefore allocated the same reference numerals and detailed explanation thereof is omitted.

As shown in FIG. 13A, the hood inner panel 42 of the hood 40 is provided with a framework formation section 44 to a central region 24. The framework formation section 44 is provided with plural (five in the present exemplary embodiment) beams 46 formed extending along the hood front-rear direction, these beams 46 being disposed at specific intervals along the hood width direction. The two hood width direction edge portions 20C, 20D are set with a higher rigidity than the framework formation section 44.

As shown in FIG. 13B, when viewed from the vehicle front side, the beams 46 have a roughly U-shaped cross-section profile open towards the hood outer panel 16 side. Specifically, the beams 46 are formed with indented portions 50 having indented profiles towards the opposite direction to that of the hood outer panel 16 side and are formed extending along the hood front-rear direction (refer to FIG. 13A). At the open edge side of the indented portions 50, a pair of flanges 48 bend out in directions progressing away from each other, and the flanges 48 are joined with a mastic (not shown in the drawings) to the hood outer panel 16. The bottom portions 50A of the indented portions 50 are formed with a curved profile when viewed in cross-section.

As shown in FIG. 13A, the framework formation section 44 that is provided with the beams 46 is formed with plural through holes 52 in a row along the hood width direction at a hood front-rear direction substantially central portion. The through holes 52 and the bead 22 are set in positions aligned with each other in the hood front-rear direction. As shown in FIG. 13B, the through holes 52 are formed in the bottom portions 50A of the indented portions 50 and they are formed as circular holes in the present exemplary embodiment, as shown in FIG. 13A.

According to the configuration described above, similar operation and advantageous effects are obtained to those of the first exemplary embodiment described earlier.

Supplementary Explanation of Exemplary Embodiments

Figure 14A:
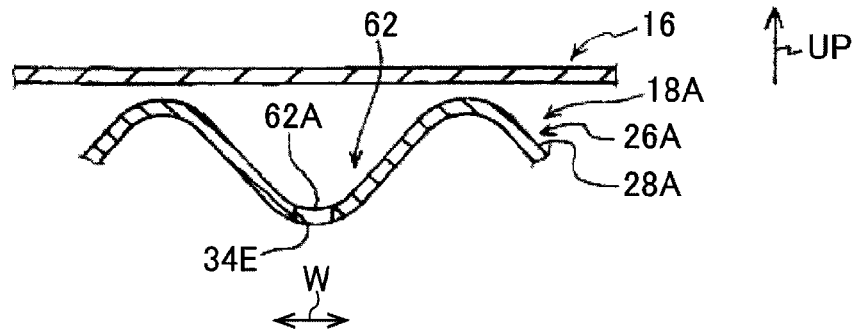
FIG. 14A is a cross-section illustrating a modified example in which a framework formation section of the hood inner panel is provided with a corrugated section with a substantially sine-wave curved profile, wherein through holes are formed through bottom portions of circular arc profile indented portions.
Figure 14B:
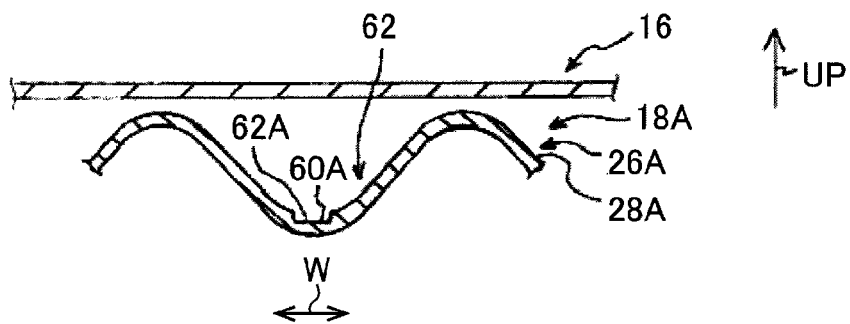
FIG. 14B is a cross-section illustrating a modified example in which a framework formation section of the hood inner panel is provided with a corrugated section with a substantially sine-wave curved profile, wherein thinned portions are formed at bottom portions of circular arc profile indented portions.

As shown in FIG. 14A and FIG. 14B, a framework formation section 26A of a hood inner panel 18A may be configured with a corrugated section 28A with a substantially sine-wave curved profile including indented portions 62 that are indented in a circular arc profile towards the opposite direction to the hood outer panel 16 side. The bottom portions 62A of the indented portions 62 shown in FIG. 14A are formed with through holes 34E in similar positions (at a substantially central portion in the hood front-rear direction) to the through holes 34 (refer for example to FIG. 2) of the first exemplary embodiment.

Figure 14C:
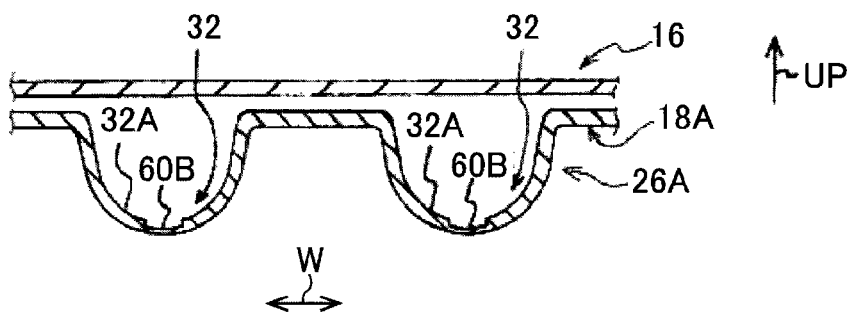
FIG. 14C is a cross-section illustrating a modified example in which thinned portions are formed in place of the through holes of the first exemplary embodiment.
Figure 14D:
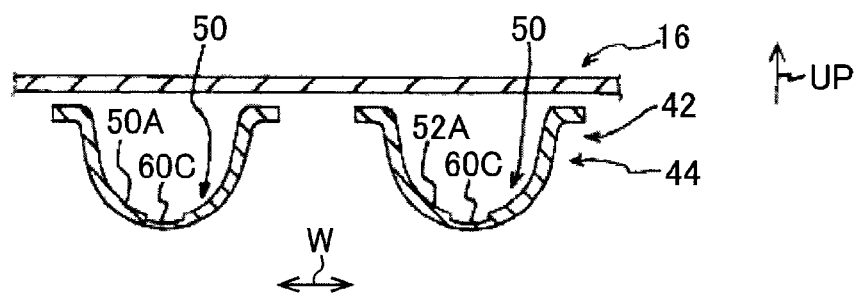
FIG. 14D is a cross-section illustrating a modified example in which thinned portions are formed in place of the through holes of the second exemplary embodiment.

In the above exemplary embodiment, through holes 34, 52 are formed through the bottom portions 32A, 50A of the indented portions 32, 50. However, for example as shown in FIG. 14B, FIG. 14C and FIG. 14D, the bottom portions 62A, 32A, 50A of the indented portions 62, 32, 50 may also be formed with thinned portions 60A, 60B, 60C in place of the through holes 34E, 34, 52 (refer to FIG. 14A, FIG. 3B, FIG. 13B). As shown in FIG. 14B to FIG. 14D, the thinned portions 60A, 60B, 60C are locations where the sheet thickness is thinner than at other locations on the framework formation section 26A, 26, 44, and are formed at similar positions (at a substantially central portion in the hood front-rear direction) to the through holes 34, 52 of the first and second exemplary embodiments (refer to FIG. 2, FIG. 13A).

In the above exemplary embodiments and their modified examples, the through holes 34, 34A to 34E, 52 and the thinned portions 60A to 60C are more preferably formed to the bottom portions 32A, 50A, 62A of the indented portions 32, 50, 62. However, the through holes or thinned portions may also be formed for example to the apex portions on the hood outer panel side of the corrugated section of the framework formation section of the hood inner panel.

As shown in FIG. 2 and FIG. 13A, the indented portions 32, 50 are formed extending along the hood front-rear direction in the present exemplary embodiment, and such a configuration is preferable. However, indented portions or the like may be formed in a different longitudinal direction, for example extending in a diagonal direction with respect to the hood front-rear direction. Configuration may also be made with plural indented portions set extending in directions (longitudinal directions) intersecting each other.

Furthermore, in the above exemplary embodiments the beads 22 are formed as weakened portions to substantially central positions in the hood front-rear direction at the two hood width direction edge portions 20C, 20D, and such a configuration is preferable. However, configuration may also be made in which such weakened portions are not formed at the two hood width direction sides at the outer peripheral edge portions of the hood inner panel. Configuration may also be made with through holes or thinned portions formed to act as weakened portions in place of the bead 22 in the above exemplary embodiments.

Note that in the above exemplary embodiments, the hood 14 (the hood outer panel 16 and the hood inner panel 18, 42) are constructed from an aluminum alloy, however the hood may for example be a hood constructed from a different metal such as steel, or a hood constructed from a resin.

The invention claimed is:

1. A vehicle hood structure comprising:
a hood outer panel configuring an outer sheet of a hood;
a hood inner panel disposed at a hood bottom side with respect to the hood outer panel, joined to the hood outer panel and configuring an inner sheet of the hood; and
a framework formation section configuring a central region of the hood inner panel excluding outer peripheral edge sections of the hood inner panel and formed with a plurality of indented portions having indented profiles indented towards an opposite side to that of a hood outer panel side, and with a plurality of through holes, a plurality of thinned portions, or any combination thereof, formed in a single row along a hood width direction at a hood front-rear direction substantially central portion of the framework formation section,
wherein the indented portions are formed so as to extend along the hood front-rear direction, and
wherein the through holes, the thinned portions, or any combination thereof are formed at only bottom portions of the indented portions.

2. The vehicle hood structure of claim 1 wherein:
two hood width direction sides of the outer peripheral edge sections of the hood inner panel are set with a higher rigidity than the framework formation section;
weakened portions are formed at locations in the two hood width direction sides of the outer peripheral edge sections, the locations of the weakened portions being aligned in the hood front-rear direction with positions of the through holes, the thinned portions, or any combination thereof; and
the weakened portions are set with a lower rigidity than other locations of the two hood width direction sides of the outer peripheral edge sections.

3. The vehicle hood structure of claim 2, wherein the weakened portions are beads formed along a hood width direction in hood plan view, and the weakened portions are formed so as to act as initiation points where fold-bending occurs during load input to the hood inner panel from the hood front side before fold-bending occurs in the framework formation section.

4. A vehicle hood structure comprising:
a hood outer panel configuring an outer sheet of a hood; and
a hood inner panel disposed at a hood bottom side with respect to the hood outer panel, joined to the hood outer panel and configuring an inner sheet of the hood,
wherein, due to a plurality of indented portions having indented profiles formed in the hood inner panel towards the opposite side to a hood outer panel side, and due to a plurality of through holes, a plurality of thinned portions, or any combination thereof formed at only bottom portions of the indented portions so as to form a single row along a hood width direction at a hood front-rear direction substantially central portion of the hood inner panel, the hood inner panel is more easily deformable when load is input to the hood from the hood front direction than when load is input to the hood from the hood top direction, and
wherein the indented portions are formed so as to extend along the hood front-rear direction.

5. A vehicle hood structure comprising:
a hood outer panel configuring an outer sheet of a hood; and
a hood inner panel disposed at a hood bottom side with respect to the hood outer panel, joined to the hood outer panel and configuring an inner sheet of the hood,
wherein, due to a plurality of indented portions having indented profiles formed in the hood inner panel towards the opposite side to a hood outer panel side, and due to a plurality of through holes, a plurality of thinned portions, or any combination thereof formed at only bottom portions of the indented portions so as to form a single row along a hood width direction at a hood front-rear direction substantially central portion of the hood inner panel, the hood inner panel is more easily deformable when compression load in the hood front-rear direction is input to the indented portions than when tension load in the hood front-rear direction is input to the indented portions from the hood top direction, and
wherein the indented portions are formed so as to extend along the hood front-rear direction.

6. A vehicle hood structure applied to a hood that is capable of rotational movement about an axis running along a hood width direction at a hood front-rear direction rear edge portion of the hood and that is restricted from moving towards a hood rear side, the vehicle hood structure comprising:
a pair of weakened portions formed to two hood width direction edge sections at a hood front-rear direction substantially central portion of the hood; and
a structure provided at a single straight line connecting together the pair of weakened portions and configured to more easily perform bending deformation towards a hood top side than to perform bending deformation towards a hood bottom side in response to load with a hood top-bottom direction component;
wherein the structure that more easily performs bending deformation towards the hood top side than bending deformation towards the hood bottom side in response to load with a hood top-bottom direction component comprises an indented portion having an indented profile towards the hood bottom side and a through hole, a thinned portion, or any combination thereof is formed at only a bottom portion of the indented portion, and
wherein the indented portion is formed so as to extend along the hood front-rear direction.

7. The vehicle hood structure of claim 1, wherein the indented portions having the indented profiles include flat parts that separate adjacent curved parts.

* * * * *